United States Patent
DiVincent et al.

(10) Patent No.: US 9,600,304 B2
(45) Date of Patent: *Mar. 21, 2017

(54) DEVICE CONFIGURATION FOR MULTIPLE USERS USING REMOTE USER BIOMETRICS

(71) Applicant: Apple Inc., Cupertino, CA (US)

(72) Inventors: Michael DiVincent, Cupertino, CA (US); Nicole J. Hollopeter, Cupertino, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 14/161,996

(22) Filed: Jan. 23, 2014

(65) Prior Publication Data

US 2015/0205623 A1    Jul. 23, 2015

(51) Int. Cl.
*G06F 21/00* (2013.01)
*G06F 9/445* (2006.01)
(Continued)

(52) U.S. Cl.
CPC ............ *G06F 9/4451* (2013.01); *G06F 21/32* (2013.01); *G06F 21/35* (2013.01); *G06F 21/62* (2013.01);
(Continued)

(58) Field of Classification Search
USPC .......... 726/1–7, 16–21, 26–33; 713/182–186
See application file for complete search history.

(56) References Cited

U.S. PATENT DOCUMENTS

| 6,028,950 A | 2/2000 | Merjanian |
| 7,564,369 B1 | 7/2009 | Adams et al. |

(Continued)

FOREIGN PATENT DOCUMENTS

| CN | 1526251 | 9/2004 |
| CN | 2932523 | 8/2007 |

(Continued)

OTHER PUBLICATIONS

Uchida, "Fingerprint-based user-friendly interface and pocket-PID for mobile authentication," Proceedings of the 15th International Conference on Pattern Recognition, 2000, vol. 4, pp. 205-209; Digital Object Identifier: 10.1109/ICPR.2000.902896.

(Continued)

*Primary Examiner* — Madhuri Herzog
(74) *Attorney, Agent, or Firm* — Brownstein Hyatt Farber Schreck, LLP

(57) ABSTRACT

An electronic device receives data associated with at least one biometric detected by a sensor of a remote control device. The biometric may be at least one fingerprint, retinal scan, facial image, and/or any other biometric. A profile for a user associated with the data is determined out of a number of possible profiles based on the data. The electronic device is then configured in one or more ways according to the determined user profile. Such configuration may include any way that the electronic device may be personalized and/or otherwise altered. In this way, an electronic device may provide a personalized experience for a number of different users without burdening and/or annoying the respective users.

20 Claims, 4 Drawing Sheets

(51) Int. Cl.
- *H04L 9/32* (2006.01)
- *H04L 29/06* (2006.01)
- *G06F 21/62* (2013.01)
- *G06F 21/32* (2013.01)
- *G06F 21/35* (2013.01)

(52) U.S. Cl.
CPC .............. *H04L 9/32* (2013.01); *H04L 9/3231* (2013.01); *H04L 63/0861* (2013.01); *G06F 2221/2149* (2013.01)

(56) References Cited

U.S. PATENT DOCUMENTS

| | | |
|---|---|---|
| 8,055,001 B2 | 11/2011 | Boguslavskij |
| 8,192,280 B2 | 6/2012 | Muth |
| 8,279,049 B2 | 10/2012 | Maier |
| 8,299,889 B2 | 10/2012 | Kumar et al. |
| 8,381,239 B2 | 2/2013 | Burton et al. |
| 8,421,931 B2 | 4/2013 | Park et al. |
| 8,464,289 B2 | 6/2013 | Pan |
| 8,553,947 B2 | 10/2013 | Benini |
| 8,561,889 B2 | 10/2013 | Block |
| 8,648,692 B2 | 2/2014 | Himmelstein |
| 8,656,486 B2 | 2/2014 | Hicks et al. |
| 9,053,310 B2 | 6/2015 | Oberheide |
| 9,160,743 B2 * | 10/2015 | Anantharaman ... H04L 63/0861 |
| 9,319,726 B2 * | 4/2016 | Beadle ............... H04N 21/2668 |
| 2003/0028872 A1 | 2/2003 | Milovanovic et al. |
| 2003/0172283 A1 | 9/2003 | O'Hara |
| 2004/0179692 A1 | 9/2004 | Cheng |
| 2006/0107281 A1 | 5/2006 | Dunton |
| 2006/0271791 A1 | 11/2006 | Novack |
| 2006/0282671 A1 * | 12/2006 | Burton .................... G06F 21/32 713/176 |
| 2006/0293892 A1 | 12/2006 | Pathuel |
| 2007/0113165 A1 | 5/2007 | Hsieh et al. |
| 2007/0299670 A1 | 12/2007 | Chang |
| 2008/0026725 A1 | 1/2008 | Cha |
| 2008/0278635 A1 | 11/2008 | Hardacker et al. |
| 2008/0316358 A1 * | 12/2008 | Beadle ............... H04N 5/44543 348/565 |
| 2009/0058595 A1 | 3/2009 | Mainguet et al. |
| 2009/0138907 A1 | 5/2009 | Wiser et al. |
| 2009/0169070 A1 | 7/2009 | Fadell |
| 2009/0251619 A1 | 10/2009 | Seidel et al. |
| 2010/0052853 A1 | 3/2010 | Hilton |
| 2010/0138914 A1 | 6/2010 | Davis et al. |
| 2010/0146278 A1 | 6/2010 | Maier |
| 2010/0157168 A1 | 6/2010 | Dunton et al. |
| 2010/0171634 A1 | 7/2010 | Liang |
| 2011/0121943 A1 | 5/2011 | Morovitz et al. |
| 2011/0221568 A1 * | 9/2011 | Giobbi ........................ 340/5.82 |
| 2011/0221622 A1 | 9/2011 | West et al. |
| 2012/0135684 A1 | 5/2012 | Shrum et al. |
| 2012/0167123 A1 | 6/2012 | Gavita |
| 2012/0204201 A1 | 8/2012 | Cassidy et al. |
| 2012/0206236 A1 | 8/2012 | King |
| 2012/0314140 A1 | 12/2012 | Wiser et al. |
| 2013/0133022 A1 | 5/2013 | Bi et al. |
| 2014/0122645 A1 | 5/2014 | Brown |
| 2014/0230018 A1 * | 8/2014 | Anantharaman ... H04L 63/0861 726/4 |
| 2015/0150103 A1 * | 5/2015 | Marais .................... G06F 21/35 726/7 |
| 2015/0205622 A1 | 7/2015 | DiVincent et al. |
| 2015/0206366 A1 | 7/2015 | DiVincent et al. |

FOREIGN PATENT DOCUMENTS

| | | |
|---|---|---|
| CN | 101261504 | 9/2008 |
| CN | 101783063 | 7/2010 |
| CN | 201965635 | 9/2011 |
| CN | 102609186 | 7/2012 |
| CN | 102750434 | 10/2012 |
| CN | 102930195 | 2/2013 |
| CN | 102986201 | 3/2013 |
| DE | 10117765 | 10/2002 |
| EP | 1173838 | 1/2002 |
| EP | 2429183 | 3/2012 |
| GB | 2388941 | 11/2003 |
| JP | 2000244830 | 9/2000 |
| JP | 2001045580 | 2/2001 |
| JP | 2006270845 | 5/2006 |
| JP | 2010087596 | 4/2010 |
| KR | 20100125484 | 1/2010 |
| WO | WO 01/91057 | 11/2001 |
| WO | WO 03/050770 | 6/2003 |
| WO | WO 03/053060 | 6/2003 |
| WO | WO 2004/055717 | 7/2004 |

OTHER PUBLICATIONS

Evaluation Report dated May 20, 2016, ZL 2015200460664, 13 pages.

* cited by examiner

DEVICE CONFIGURATION FOR MULTIPLE USERS USING REMOTE USER BIOMETRICS

TECHNICAL FIELD

This disclosure relates generally to electronic device configuration, and more specifically to configuring electronic devices based on remotely received user biometrics.

BACKGROUND

Many electronic devices (such as computing devices, smart phones, set top boxes, and so on) may be configurable to provide a personalized experiences for different users. Such personalized experiences may include configuring a variety of different aspects of a user's experience with an electronic device.

Many electronic devices are only able to provide a personalized experience for a single user. In such cases, the electronic device may be configured to alter one or more aspects of a user's experience with the device, but such alteration will alter the experience of any user that utilizes the device.

Some electronic devices are capable of providing personalized experiences for different users via one or more user accounts. In such cases a user may be required to provide a log in and/or password in order to enter the user account and access the personalized experience. Such may be annoying and/or burdensome to users and such annoyance or burden may be magnified when a user is attempting to utilize the electronic device via one or more remote control devices.

SUMMARY

The present disclosure discloses systems and methods for configuring electronic devices based on remotely received user biometrics. An electronic device may receive data associated with at least one biometric detected by a sensor of a remote control device. A profile for a user associated with the data may be determined out of a number of possible profiles based on the data. The electronic device may then be configured in one or more ways according to the determined user profile. In this way, an electronic device may provide a personalized experience for a number of different users without burdening and/or annoying the respective users.

Personalization of experiences through such configuration of the electronic device may include, but is not limited to, providing access and/or not providing access to one or more files or applications, altering the presentation of one or more user interfaces, enabling and/or disabling one or more software and/or hardware components, altering the way that one or more user interfaces may be interacted with, modifying presentation settings, altering the functionality of one or more software and/or hardware components, organizing storage of one or more files and/or applications, configuring user authentication for one or more content delivery and/or other services, and/or any other aspect of a user's experience with the electronic device.

In some cases, the electronic device may remain configured according to the determined profile until the occurrence of one or more reconfiguration events. Such reconfiguration events may include receipt of an indication to reconfigure, expiration of a timer, receipt of data associated with at least one different biometric, and/or any other such event that indicates that reconfiguration is to be performed. In such cases, the electronic device may be reconfigured according to one or more other determined user profiles, generic profiles, default profiles, and so on.

In some implementations, the biometric may include one or more fingerprints detected by one or more touch sensors of the remote control device and/or other sensors capable of detecting one or more fingerprints. However, in other implementations the biometric may include one or more of a variety of different biometrics including, but not limited to, retinal or facial images, palm prints, toe prints, hand prints, voice samples, gesture patterns, and/or any other kind of biometric detectable by one or more sensors of the remote control device.

In one or more implementations, the electronic device and/or the remote control device may interact with one or more other electronic devices. Such interaction may include, but is not limited to, transmitting and/or the biometric and/or a hash value derived from the biometric, transmitting and/or obtaining data regarding the user profile and/or the user profile, transmitting and/or obtaining a user identifier derived from and/or included in the data and receiving data regarding the user profile, and/or other interactions.

In various embodiments, a system for configuring electronic devices based on remotely received user biometrics includes: at least one remote control device including at least one sensor that detects at least one biometric and at least one electronic device that is configured to receive at least one instruction from the at least one remote control device. The at least one electronic device receives data associated with the at least one biometric, determines a profile that is associated with the data out of a plurality of possible profiles, and configures the at least one electronic device according to the profile.

In one or more embodiments, a method for configuring electronic devices based on remotely received user biometrics includes: receiving, utilizing at least one electronic device, data associated with at least one biometric detected by at least one sensor of at least one remote control device that is configured to transmit at least one instruction to the at least one electronic device; determining, utilizing the at least one electronic device, a profile that is associated with the data out of a plurality of possible profiles; and configuring the at least one electronic device according to the determined profile.

In some embodiments, an electronic device includes at least one communication component that is configured to receive at least one instruction from at least one remote control device and at least one processing unit that: receives data associated with at least one biometric detected by at least one sensor of the at least one remote control device; determines a profile that is associated with the data out of a plurality of possible profiles; and configures the electronic device according to the profile.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1:
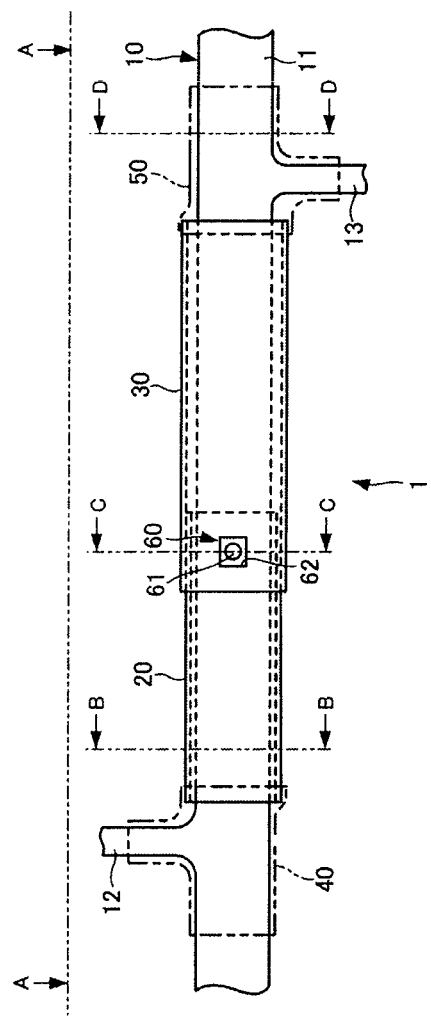
FIG. 1 is an isometric view of a system for electronic device configuration using remotely received user biometrics.

The description that follows includes sample systems, methods, and computer program products that embody various elements of the present disclosure. However, it should be understood that the described disclosure may be practiced in a variety of forms in addition to those described herein.

The present disclosure discloses systems and methods for configuring electronic devices based on remotely received user biometrics. An electronic device may receive data associated with at least one biometric detected by a sensor of a remote control device. A profile for a user associated with the data may be determined out of a number of possible profiles based on the data. The electronic device may then be configured in one or more ways according to the determined user profile.

In some cases, the electronic device may remain configured according to the determined profile until the occurrence of one or more reconfiguration events. Such reconfiguration events may include receipt of an indication to reconfigure (such as a user log out), expiration of a timer, receipt of data associated with at least one different biometric, and/or any other such event that indicates that reconfiguration is to be performed. In such cases, the electronic device may be reconfigured according to one or more other determined user profiles, generic profiles, default profiles, and so on.

Personalization of experiences through such configuration of the electronic device may include, but is not limited to, providing access (and/or not providing access) to one or more files or applications, altering the presentation of one or more user interfaces, enabling and/or disabling one or more software and/or hardware components, altering the way that one or more user interfaces may be interacted with, modifying presentation settings (such as volume, brightness, contrast, and so on), altering the functionality of one or more software and/or hardware components, organizing storage of one or more files and/or applications, configuring user authentication for one or more content delivery and/or other services, and/or any other aspect of a user's experience with the electronic device.

In some implementations, the biometric may include one or more fingerprints detected by one or more touch sensors of the remote control device and/or other sensors capable of detecting one or more fingerprints. However, in other implementations the biometric may include one or more of a variety of different biometrics including, but not limited to, retinal or facial images, palm prints, toe prints, hand prints, voice samples, gesture patterns, and/or any other kind of biometric detectable by one or more sensors of the remote control device.

In various implementations, the remote control device may transmit the biometric to the electronic device, a hash value derived from the biometric, a user identifier associated with the biometric, and/or other data derived from and/or otherwise associated with the biometric. In one or more implementations, the remote control device may interact with one or more other electronic devices (such as one or more computing devices configured in a cloud computing configuration via one or more communication networks) as part of transmitting such data.

In one or more implementations, the electronic device may interact with one or more other electronic devices (such as one or more computing devices configured in a cloud computing configuration via one or more communication networks) as part of determining the user profile based on the received data associated with the biometric. Such interaction may include, but is not limited to, transmitting the biometric and/or a hash value derived from the biometric and obtaining data regarding the user profile (such as a user identifier) and/or the user profile, transmitting a user identifier derived from and/or included in the data and receiving data regarding the user profile, and/or other such interaction.

In various cases, the configuration of the electronic device may be partial instead of total. For example, the electronic device may be configured for a child such that access to a particular file has not been enabled. A biometric for the child's parent may be remotely received and, in response, the electronic device may be configured to enable access to the particular file based on the parent's biometric without reconfiguring any other aspect of the electronic device currently configured for the child based on the parent's profile.

In this way, as more fully elaborated below and in the accompanying illustrations, an electronic device may provide a personalized experience for a number of different users without burdening and/or annoying the respective users.

FIG. 1 is an isometric view of a system 100 for electronic device configuration using remotely received user biometrics. The system 100 includes an electronic device 102 and a remote control device 101. The remote control device may be operable to transmit one or more instructions to the electronic device.

Though the electronic device 102 is illustrated as a television and the remote control device 101 is illustrated as a dedicated remote control with a single control element (e.g., the sensor 104, it is understood that this is an example. In various implementations the electronic device may be any electronic device that is capable of receiving instructions from the remote control device and the remote control device may include any electronic device that is capable of transmitting instructions to the electronic device. Such electronic device may include one or more televisions, set top boxes, media centers, desktop computing devices, media controllers, media players, laptop computing devices, wearable devices, tablet computing devices, mobile computing devices, cellular telephones, smart phones, kitchen appliances, automobiles, voice over internet protocol telephones, displays, microphones, speakers, video game console, HVAC (heating, ventilation, and/or air conditioning) systems, lighting systems, and/or any other electronic device(s).

The remote control device 101 may include at least one sensor 104 that detects at least one biometric from at least one user 103. As illustrated, the sensor may be a touch sensor (such as a capacitive sensor, an ultrasonic sensor, and/or other touch sensor) that is operable to detect at least one fingerprint. However, it is understood that this is an example. In various implementations, the sensor may be any kind of sensor (such as one or more cameras, inertial sensors, photoplethysmographic sensors, and so on) that is operable to detect at least one biometric of the user. Such biometrics may include, but are not limited to, retinal or facial images, palm prints, toe prints, hand prints, voice samples, gesture patterns, and/or any other kind of biometric detectable by the sensor.

The remote control device 101 may transmit data regarding the biometric to the electronic device 102. The transmitted data may include the biometric, a hash value derived from the biometric (which may uniquely identify the biometric), a user identifier associated with the biometric, and/or other data derived from and/or otherwise associated with the biometric. In one or more implementations, the remote control device may interact with one or more other electronic devices (such as one or more computing devices configured in a cloud computing configuration via one or more communication networks) (see additional electronic device(s) 208 in FIG. 2) as part of transmitting such data.

The electronic device 102 may receive data associated with the biometric. A profile for a user 103 associated with the data may be determined out of a number of possible profiles. The electronic device then configure itself in one or more ways according to the determined user profile.

Figure 2:
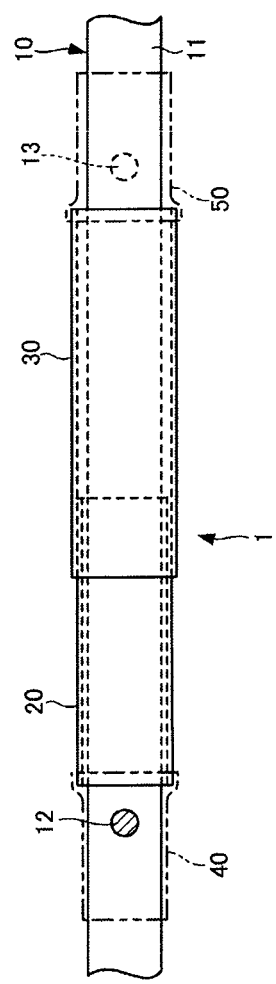
FIG. 2 is a block diagram illustrating the functional relationships of components of the system of FIG. 1.

In one or more implementations, the electronic device 102 may interact with one or more other electronic devices (such as one or more computing devices configured in a cloud computing configuration via one or more communication networks) (see additional electronic device(s) 208 in FIG. 2) as part of determining the user profile based on the received data associated with the biometric. Such interaction may include, but is not limited to, transmitting the biometric and/or a hash value derived from the biometric and obtaining data regarding the user profile (such as a user identifier) and/or the user profile, transmitting a user identifier derived from and/or included in the data and receiving data regarding the user profile, and/or other such interaction.

By configuring itself according to the determined user profile, the electronic device 102 may personalize an experience the user 103 will have when interacting with the electronic device. Such personalization may include, but is not limited to, providing access (and/or not providing access) to one or more files or applications via the electronic device, altering the presentation of one or more user interfaces provided by the electronic device, enabling and/or disabling one or more software and/or hardware components of the electronic device, altering the way that one or more user interfaces of the electronic device may be interacted with, modifying presentation settings (such as volume, brightness, contrast, and so on) of the electronic device, altering the functionality of one or more software and/or hardware components of the electronic device, organizing storage of one or more files and/or applications stored by the electronic device, one or more favorites, one or more date book entries, one or more contacts, one or more emails or email databases, configuring user authentication for one or more content delivery and/or other services, and/or any other aspect of the user's experience with the electronic device.

By way of a first example, a husband and a wife may both utilize the electronic device 102. Each may have a respective set of files and applications loaded on the electronic device. Further, each may have configured a respective user interface configuration (such as a volume level, a screen layout, a background picture, a screen saver, screen saver and/or energy saver settings, a desktop configuration, a file folder organization structure, a brightness and/or contrast level, browser favorites, navigation cursor speed, and/or any other such user interface configuration settings) for the electronic device. When the husband provides his biometric to the remote control device 101 via the sensor 104, the electronic device may configure itself to provide his set of files and applications and to provide one or more user interfaces according to his user interface configuration. By way of contrast, when the wife provides her biometric to the remote control device via the sensor, the electronic device may configure itself to provide her set of files and applications and to provide one or more user interfaces according to her user interface configuration.

By way of a second example, the electronic device 102 may suggest content (such as one or more movies, songs, music videos, games, product advertisements, television shows, and so on) during usage. Such suggestions may be based on other content that has been accessed, searched, and so on during usage. In this example, such suggestions may be based on content that has been accessed, searched, and so on during usage while configured according to the current user profile. Content that has been accessed, searched, and so on during usage while configured according to another user's profile may not be utilized when determining content to suggest.

For instance, a first roommate may provide a biometric utilizing the remote control device 101 and utilize the electronic device 102 to access content at a first time. A second roommate may provide a biometric utilizing the remote control device and utilize the electronic device to access content at a second time. Then, the first roommate may again provide a biometric utilizing the remote control device and utilize the electronic device to access content at a third time. During usage at the third time, the electronic device may determine to suggest content. In suggesting such content, the electronic device may determine content to suggest based on the content accessed at the first time and the third time, but not the second time. In this way, the suggested content is selected for the first roommate based on the first roommate's choices, not the second roommate's choices, even though both roommates utilized the same electronic device.

By way of a third example, a parent may specify that an electronic device 102 is to allow the parent to view any content but that the parent's child is not allowed to access content rated to include violent subject matter. In such an example, when the child provides a biometric utilizing the remote control device 101 and accesses content utilizing the electronic device 102, the electronic device may not allow the child to access any content rated to include violent subject matter. However, when the parent provides a biometric utilizing the remote control device and accesses content utilizing the electronic device, the electronic device may allow the parent to access any content, including content rated to include violent subject matter.

By way of a fourth example, the user 103 may have configured the electronic device 102 to automatically authenticate the user for one or more content delivery and/or other services with which the user has an account. Such an account may be an application service account, a video or music download account, a video or music on demand account, and/or any other such content delivery or other service. Further, such a content delivery and/or other service may be configured to require user authentication such as a password, the biometric, and/or other such authentication mechanism. In such a case, the electronic device may confirm (such as by providing the biometric, providing evidence that the correct biometric has been provided, providing a password or other authentication information associated with the biometric or user, and so on) that the user has been authenticated by providing the biometric in order to automatically authenticate the user for the account. As such, when the user utilizes the content delivery and/or other service via the electronic device, the content delivery and/or other service may treat the user as already authenticated.

By way of a fifth example, a television may be shipped with a remote control device and configured with a default profile for a generic user (one not associated with a biometric and/or one defined to be utilized when a provided biometric is not recognized). When the purchaser of the television ("Fred") provides a biometric to the remote, the television may not recognize data received associated with Fred's biometric because the television has not yet been configured to recognize data associated with any biometrics. As such, the television may poll devices on a local network and/or other local communication medium for any devices that recognize the data associated with the biometric. Another device (such as Fred's smart phone) which does so recognize the data associated with the biometric may respond with information that the other device has associated with the data. The television may then configure itself based on the received information.

In some cases of the above example, the information may include the profile and/or other configuration details. However, in other cases, not all of the configuration details known to the other device may be applicable to the television. In such a case, the other device may only transmit and/or the television may only configure itself according to the configuration details applicable to the television. For instance, configuration details stored by the smart phone that are applicable to the television may only include Fred's name. As such, the television may configure itself to present a prompt reading: "Hello, Fred. Shall we set me up for you?"

In various cases, the other device may require confirmation before responding to the information request from the television regarding the data associated with the biometric. For example, Fred's smart phone may receive such a request and require Fred to provide a biometric before the smart phone provides the information to the television.

In some cases, the electronic device 102 may remain configured according to the determined profile until the occurrence of one or more reconfiguration events. Such reconfiguration events may include receipt of an indication to reconfigure (such as a user log out), expiration of a timer, receipt of data associated with at least one different biometric, and/or any other such event that indicates that reconfiguration is to be performed. In such cases, the electronic device may be reconfigured according to one or more other determined user profiles, generic profiles, default profiles, and so on.

For example, a parent may configure a television to enable the parent to access any program but block their children from accessing certain programs. When the parent provides a biometric, the television may configure itself for the parent. However, after a certain period of inactivity (such as thirty minutes), the television may reconfigure itself (such as a profile associated with the children, a generic profile that is not allowed to access the certain programs, and so on) to no longer be configured according to the parent's profile. In this way, a parent may provide her biometric to use the television and not have to worry about having to remember to reconfigure after use in order to prevent her children from accessing the certain programs.

By way of another example, a husband and wife may both use a music player. Each may have the music player configured with a respective set of playlists that is configured for each upon providing a respective biometric to the remote control device 101. The music player may also be configured with a default setting for a generic user that does not have any playlists. When the husband or wife provides their respective biometric and the music player configures itself accordingly, the music player may reconfigure itself back to the generic user profile if a timer (such as a two hour timer) expires between times that input is received. In this way, the music player may be better prepared for a next user if the husband or wife were using the music player and then left.

By way of still another example, the electronic device 102 may be originally configured with settings from the factory. A user may configure the electronic device to provide a personalized environment when the user provides a biometric utilizing the remote control device 101. However, the user may make a change as part of personalizing the configuration for the user that causes the electronic device to no longer function correctly in some way (such as deleting one or more originally installed programs, incorrectly modifying a communication component's settings such that the communication component can no longer communicate with one or more other devices, and so on). As such, the electronic device may enable the user to resent the electronic device back to the factory settings. This may erase the profile associated with the user's biometric and enable them to create a new one.

By way of yet another example, a husband and a wife may both utilize the electronic device 102. Each may have a respective set of files and applications loaded on the electronic device, but another set of files and applications may be shared by both. When the husband or the wife desires to delete and/or modify the shared files and/or applications, each may need to provide biometrics to the remote control device 101 via the sensor 104. When both biometrics are received, the electronic device may configure itself to be able to delete and/or modify the shared files and/or applications.

In various cases, the configuration of the electronic device 102 may be partial instead of total. For example, the electronic device may be configured for a child such that access to a particular file has not been enabled. A biometric for the child's parent may be remotely received and, in response, the electronic device may be configured to enable access to the particular file based on the parent's biometric without reconfiguring any other aspect of the electronic device currently configured for the child based on the parent's profile.

For instance, a parent may configure an electronic device 102 with a generic profile that does not require input of a biometric and/or is utilized whenever the biometric is not the parent's biometric. The generic profile may allow access to all content that does not include a "mature" rating. As such, the parent's child may utilize the set top box to view all content that is not rated mature. When the child attempts to view content that is rated mature, the set top box may prompt for entry of the parent's biometric via the remote control device 101. If the parent enters the biometric for the child, the child may then be able to access that specific program but the set top box may not otherwise be reconfigured for the parent. After the expiration of a timer corresponding to the running time of the specific program (or in some cases upon the child switching away from the specific program), the enablement of access to the particular program may be rescinded and the child may no longer be able to use the set top box to access the particular program.

Although the system 100 is illustrated and described above as including a user providing a single biometric, it is understood that this is an example. In various cases, the user may provide a plurality and/or sequence of various biometrics (which may or may not be the same type of biometric) and data associated with the plurality and/or sequence of various biometrics may be utilized to determine the user profile to use. For example, a user's profile may be associated with each of the fingerprints of the user's left hand from pinkie to thumb. As such, the user may provide the user's fingerprints of each finger of the user's left hand from pinkie to thumb via the remote control device 101 in order for the electronic device 102 to configure itself according to the user's profile.

Further, although the system 100 is illustrated and described above as including a user providing a biometric for the user, this is an example. In various cases, the user may provide a biometric for someone other than the user. For example, the user may have the user's profile associated with a fingerprint of the user's wife, a paw print of the user's cat, and/or other such biometric of another and the user may arrange for such to be provided via the remote control device 101 in order for the electronic device 102 to configure itself according to the user's profile.

Additionally, though the remote control device 101 is illustrated and described above as transmitting instructions to the electronic device 102, it is understood that this is an example. In various implementations, the remote control device may be capable of transmitting instructions to one or more other electronic devices (such as the additional electronic device(s) 208 of FIG. 2) without departing from the scope of the present disclosure.

FIG. 2 is a block diagram illustrating the functional relationships 200 of components of the system 100 of FIG. 1. The remote control device 101 and the electronic device 102 may be operable to communicate with each other and/or with one or more additional electronic device(s) 208 (such as one or more computing devices configured in a cloud computing configuration) via one or more wired, wireless, local, and/or network communication connections.

As illustrated, the remote control device 101 may include one or more sensors 104, one or more processing units 201, one or more non-transitory storage media 202 (which may take the form of, but is not limited to, a magnetic storage medium; optical storage medium; magneto-optical storage medium; read only memory; random access memory; erasable programmable memory; flash memory; and so on), and/or one or more communication components 203 (such as one or more wired and/or wireless communication components including, but not limited to, one or more Bluetooth communication components, WiFi communication components, infrared communication components, Ethernet communication components, and so on) that may be utilized to communicate with the electronic device 102 and/or the additional electronic device(s) 208.

As also illustrated, the electronic device 102 may include one or more processing units 204, one or more non-transitory storage media 207, one or more communication components 205 that may be utilized to communicate with the remote control device 101 and/or the additional electronic device(s) 208, and/or one or more input/output components 206 (such as one or more displays, speakers, microphones, touch screens, touch pads, keyboards, virtual keyboards, mice, printers, and/or any other input/output device and/or input/output device interface).

Although the remote control device 101 and the electronic device 102 are illustrated and described as including particular components such as processing units 201 and 204, it is understood that these are examples. In various cases, the remote control device and/or the electronic device may include various arrangements of the same, similar, and or different components without departing from the scope of the present disclosure.

For example, in some cases the remote control device 101 may not include a processing unit 201. Instead, the remote control device may only include the sensor 104 and the communication components 203. In such a case, the remote control device may communicate any biometric detected by the sensor 104 to the electronic device 102 via the communication component 203 without performing any processing.

By way of another example, in some cases the electronic device 102 may include one or more sensors (not shown). For instance, in some cases a television may include an ambient light sensor that is utilized in dimming the television display when the ambient lighting is bright and/or brightening the television display when the ambient lighting is dim.

By way of still another example, in some cases the sensor 104 may be the sole user interface component of the remote control device 101.

Further, the additional electronic device(s) 208 may similarly include one or more components (not shown) such as one or more processing units, storage media, communication components, input/output devices, and/or any other such components. For example, the additional electronic device(s) may include one or more communication components for communicating with the remote control device 101 and/or the electronic device 102.

Figure 3:
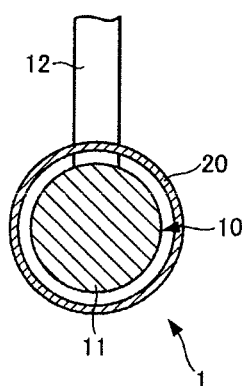
FIG. 3 is a flow chart illustrating a method for electronic device configuration using remotely received user biometrics. This method may be performed by the system of FIG. 1.

FIG. 3 is a flow chart illustrating a method 300 for electronic device configuration using remotely received user biometrics. This method may be performed by the system 100 of FIG. 1.

The flow begins at block 301 and proceeds to block 302 where an electronic device operates. The flow then proceeds to block 303 where the electronic device determines whether or not data associated with at least one detected biometric is received from at least one remote control device associated with the electronic device. If so, the flow proceeds to block 304. Otherwise, the flow returns to block 302 where the electronic device continues to operate.

At block 304, after the electronic device determines data associated with at least one detected biometric is received, the electronic device determines a profile out of a number of possible user profiles that is associated with the received data. The flow then proceeds to block 305 where the electronic device is configured based on the determined profile.

Finally, the flow returns to block 302 where the electronic device continues to operate while configured according to the determined profile.

Although the method 300 is illustrated and described as including particular operations performed in a particular order, it is understood that this is an example. In one or more implementations, the method 300 may include various arrangements of the same, similar, and/or different operations without departing from the scope of the present disclosure.

For example, operation 304 describes the electronic device as determining the profile based on data associated with a biometric received from the remote control device. However, in some implementations the electronic device may receive such data from the remote control device, transmit the data to another computing device (such as a remote data server which may be part of a cloud computing arrangement), receive information in response from the other computing device, and select the profile based on the received information from the other computing device. For instance, the received information may include a user identifier associated with the transmitted data that is used to select the profile.

Figure 4:
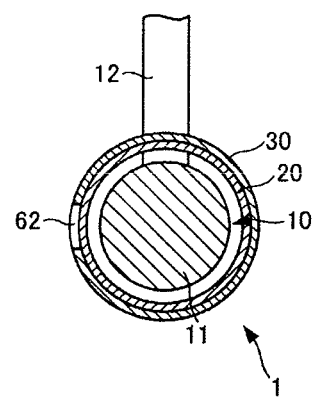
FIG. 4 is a flow chart illustrating a method for remotely obtaining user biometrics that may be utilized with the method of FIG. 3. This method may be performed by the system of FIG. 1.

FIG. 4 is a flow chart illustrating a method 400 for remotely obtaining user biometrics that may be utilized with the method 300 of FIG. 3. This method 400 may be performed by the system of FIG. 1.

The flow begins at block 401 and proceeds to block 402 where a remote control device operates. The flow then proceeds to block 403 where the remote control device determines whether or not one or more biometrics is detected via one or more sensors. If so, the flow proceeds to block 404. Otherwise, the flow returns to block 402 where the remote control device continues to operate.

At block 404, after the remote control device determines that a biometric is detected, the remote control device transmits data associated with the received biometric to the electronic device. The flow then returns to block 402 where the remote control device continues to operate.

Although the method 400 is illustrated and described as including particular operations performed in a particular order, it is understood that this is an example. In one or more implementations, the method 400 may include various arrangements of the same, similar, and/or different operations without departing from the scope of the present disclosure.

For example, the operation 404 describes the remote control device transmitting data to the electronic device regarding any biometric that is received. However, in various cases the remote control device may first confirm that the biometric is recognized before transmitting the data. In such a case, if the remote control device has not been configured to recognize a particular user's biometric, the remote control device may not transmit any data regarding that user's biometric.

As discussed above and illustrated in the accompanying figures, the present disclosure discloses systems and methods for configuring electronic devices based on remotely received user biometrics. An electronic device may receive data associated with at least one biometric detected by a remote control device. A profile for a user associated with the data may be determined out of a number of possible profiles. The electronic device may then be configured in one or more ways according to the determined user profile.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A system for configuring electronic devices based on remotely received user biometrics, comprising:
   at least one remote control device, comprising:
      at least one sensor that detects at least one biometric; and
   at least one electronic device that is configured to receive at least one instruction from the at least one remote control device; wherein:
   the at least one electronic device receives data associated with the at least one biometric, determines the data associated with the at least one biometric is not recognized, polls devices to identify devices used by a user on a local network to recognize the data associated with the biometric, receives information from one of the devices that recognizes the data associated with the at least one biometric, and configures the at least one electronic device according to a profile that is associated with the information out of a plurality of possible profiles.

2. The system of claim 1, wherein the at least one sensor comprises at least one touch sensor.

3. The system of claim 1, wherein the at least one biometric comprises at least one fingerprint.

4. The system of claim 1, wherein the at least one electronic device receives additional data associated with the at least one additional biometric, determines an additional profile that is associated with the additional data out of the plurality of possible profiles, and reconfigures the at least one electronic device according to the additional profile.

5. The system of claim 1, wherein configuring the at least one electronic device comprises at least one of providing access to at least one file, providing access to at least one application, preventing access to the at least one file, preventing access to the at least one application, altering the presentation of at least one user interface, enabling at least one hardware component, enabling at least one software component, disabling the at least one hardware component, disabling the at least one software component, altering a way with which the at least one user interface is interacted with, modifying at least one presentation setting, altering functionality of the at least one hardware component, altering functionality of the at least one software component, organizing storage of the at least one file, or organizing storage of the at least one application.

6. The system of claim 1, wherein the at least one electronic device reconfigures the at least one electronic device according to an additional profile out of the plurality of possible profiles upon the occurrence of at least one reconfiguration event.

7. The system of claim 6, wherein the at least one reconfiguration event comprises the expiration of at least one timer.

8. The system of claim 1, wherein the data associated with the at least one biometric comprises at least one of the at least one biometric, at least one hash value derived from the at least one biometric, or at least one identifier associated with the at least one biometric.

9. The system of claim 1, further comprising at least one additional electronic device wherein the at least one remote control device transmits biometric information regarding the at least one biometric to the at least one additional electronic device, receives the data in response from the at least one additional electronic device, and transmits the data to the at least one electronic device.

10. The system of claim 1, further comprising at least one additional electronic device wherein the at least one electronic device transmits biometric information regarding the at least one biometric received from the at least one remote control device to the at least one additional electronic device and receives the data in response from the at least one additional electronic device.

11. The system of claim 1, wherein the at least one remote control device transmits the data to the at least one electronic device only if the at least one remote control device recognizes the at least one biometric.

12. The system of claim 1, wherein configuring the at least one electronic device comprises configuring at least one of at least one favorite, at least one contact, at least one calendar entry, at least one datebook entry, or at least one email database entry.

13. The system of claim 1, wherein configuring the at least one electronic device comprises configuring at least one recommendation provided by the at least one electronic device.

14. The system of claim 1, wherein the plurality of possible profiles includes at least one of at least one generic profile that is not associated with a particular user or at least one default profile.

15. The system of claim 1, wherein the at least one remote control device transmits at least one instruction to at least one additional electronic device.

16. The system of claim 1, wherein the at least one electronic device receives at least one request for at least one operation that is not permitted according to the profile, prompts for entry of at least one additional biometric associated with an additional profile according to which the at least one operation is permitted, and permits the at least one operation if additional data associated with the at least one additional biometric is received.

17. The system of claim 1, wherein the configuration of the at least one electronic device comprises configuring automatic user authentication for at least one service that is utilizable via the at least one electronic device by providing authentication information to a provider of the at least one service; and wherein the at least one service comprises at least one of an application service account, a video or music download account, or a video or music on demand account.

18. An electronic device that is configured to receive an instruction from a remote control device, comprising:
a communication component that receives data associated with a biometric detected by sensor of the remote control;
a non-transitory storage medium; and
a processing unit that:
determines the data associated with the biometric is not recognized;
polls devices to identify devices used by a user, and on a local network, to recognize the data associated with the biometric;
receives information from one of the devices that recognizes the data associated with the biometric; and
configures the electronic device according to the information.

19. An electronic device, comprising:
a communication component that is configured to receive an instruction from a remote control device;
a non-transitory storage medium; and
a processing unit that:
receives data associated with a biometric detected by a sensor of the remote control device;
determines the data associated with the biometric is not recognized;
polls devices to identify devices used by a user on a local network to recognize the data associated with the biometric;
receives information from one of the devices that recognizes the data associated with the biometric; and
configures the electronic device according to the information.

20. The electronic device of claim 19, wherein the biometric is a sequence of biometrics and each of the sequence of biometrics are a same type of biometric.

* * * * *